Patented July 10, 1951

2,560,380

UNITED STATES PATENT OFFICE 2,560,380

IMPROVED DRILLING MUD COMPOSITION

Gilbert G. Wrightsman, Houston, Tex., assignor, by mesne assignments, to Standard Oil Development Company, Elizabeth, N. J., a corporation of Delaware No Drawing. Application August 25, 1948, Serial No. 46,171

4 Claims. (Cl. 252—8.5)

The present invention is directed to a drilling mud composition.

This application is a continuation-in-part of my copending application Serial No. 676,867, filed June 14, 1946, now abandoned.

In the drilling of boreholes by the rotary drilling method, it is necessary to employ a drilling mud which is circulated down through the bore of the drill stem, out through the holes or eyes of the drill bit and upwardly through the annulus between the drill stem and the wall of the hole. The drilling mud serves a number of useful purposes. It lubricates the drill bit and the drill stem, it carries cuttings upwardly out of the borehole and it exerts a hydrostatic pressure against the formations penetrated by the borehole to prevent the escape of fluids from the formations into the borehole during the drilling operation.

In the course of the drilling operation it often happens that the viscosity of the drilling mud becomes greater than desirable. The present invention is directed to the treatment of drilling muds for reducing the viscosity thereof to a desirable value.

The present invention may be described briefly as involving the treatment of an aqueous suspension of finely divided solid or colloidally suspended clay with an alkaline solution of a condensation product derived from the substitution of an aldehyde on a non-esterified hydroxy benzene carboxylic acid in order to reduce the viscosity of the suspension. If desired, an alkali metal salt of the condensation product may be formed and a solution of the salt added to the aqueous drilling fluid for reducing the viscosity thereof.

In forming the condensation product to be added to the suspension of solid in a water vehicle in accordance with the present invention, the aldehyde is preferably an aliphatic aldehyde. Examples of such aldehydes are formaldehyde, acetaldehyde and propionaldehyde, although it will be understood that aliphatic aldehydes of higher molecular weight as well as aldehydes other than the aliphatic aldehydes may be employed.

A number of materials are suitable for use as the hydroxy aromatic carboxylic acid which is reacted with the aldehyde. In general these materials may be defined as non-esterified hydroxy benzene carboxylic acids having at least two replaceable or substitutable hydrogen atoms in the aromatic nucleus in positions either ortho or para to the hydroxyl group and meta to the carboxyl group, or in positions ortho to one hydroxyl group and para to a second hydroxyl group. Suitable compounds of the above-described type include salicylic acid, p-hydroxy benzoic acid, 4-hydroxy phthalic acid, 2 hydroxy terephthalic acid, alpha, beta, and gamma resorcylic acids, gallic acid, and 2-4-6 trihydroxy benzoic acid. Because of its availability and relatively low cost, I prefer to employ salicylic acid which is a non-esterified hydroxy benzoic acid.

I prefer to prepare the drilling mud treating agent of my invention by forming an intermediate substitution product and then condensing this substitution product to form a caustic soluble, water insoluble, solid resin. The intermediate substitution product may be prepared by boiling under reflux or slight pressure a molecular excess of the desired aqueous aldehyde or a mixture of aldehydes with a selected hydroxy aromatic carboxylic acid or mixture of such acids in the presence of a catalyst such as hydrochloric acid. During the course of the reaction, the intermediate substitution product separates as a solid or as an oily layer which may be readily separated from the residual aqueous layer containing excess reactants. The intermediate substitution product, per se, is ineffective in reducing the viscosity of drilling muds.

By heating for an extensive period of time, the intermediate substitution product, prepared as above described, may be converted to a solid, condensation product. If desired, the intermediate substitution product need not be separated from the excess reactants by decantation but the excess reactants and water may be evaporated, whereupon a compact solid residue remains. Upon continued heating this solid residue becomes rubbery and swells with the evolution of water. In order to prepare a resin which is effective in treating drilling muds the solid residue must be heated until it is dark red or brown in color. Generally, heating for 2 to 4 hours at 180° to 200° C. or for 6 to 8 hours at 100° C. is sufficient to convert the rubbery material to a water insoluble resin which, when dissolved in dilute aqueous alkali metal hydroxide solution, is effective in reducing the viscosity of drilling muds.

Instead of forming a water insoluble condensation product and dissolving it in caustic solution, I may form a water soluble alkali metal salt which is also effective in treating drilling muds. This salt may be prepared by dissolving the intermediate substitution product in a slight excess of alkali metal hydroxide solution over that required to effect neutralization, evaporating the water therefrom, and then heating the resulting solid residue until it has condensed to a dark red or brown color as described above.

While I prefer to employ an alkali metal hydroxide solution in preparing the treating agent of my invention, in certain instances I may employ other alkaline reagents such as the alkali metal carbonates or bicarbonates, particularly in the preparation of water soluble alkali metal salts.

As will be apparent to workers skilled in the drilling mud treating art, the specific quantity of the alkaline, condensation product to be employed in reducing the viscosity of drilling muds may vary from one mud, i. e. one well, to another depending upon the nature of the clay constituents, i. e. the types of formations penetrated by the drill, and the quantities of weighting constituents which may be added to the mud. Likewise, the quantities which should be added from time to time in order to maintain viscosity control may vary as drilling progresses. Accordingly, when treating drilling mud with the alkaline, condensation product in accordance with my invention, it will be desirable to make periodic tests of the viscosity of the drilling mud in conventional manner and to add additional quantities of the treating agent when required. The quantity to be added to either a fresh mud or to a mud which has already been treated can readily be determined by a few simple tests wherein known incremental quantities of the treating agent are thoroughly mixed with one or more samples of the mud and the viscosity of these samples determined by conventional methods. Generally, it will be desirable to add an amount of alkaline, condensation product sufficient to reduce the viscosity of the treated mud within the range of 7 to 40 centipoises, preferably in the range of 10 to 25 centipoises. In most muds, a desirable viscosity reducing amount of condensation product will be in the range from about 0.1 to 2.5 pounds per barrel of mud although larger or smaller quantities may be employed as required to obtain or maintain a desired mud viscosity.

It will be understood that, when dissolving the condensation product in an alkali solution, the concentration of the alkali may be varied over a wide range. In like manner, the concentration of the condensation product or alkali metal salt thereof in the solution employed for treating aqueous drilling mud may be varied over a wide range. However, if the weight ratio of alkali metal hydroxide to condensation product in the solution exceeds about 1:1, a viscosity increase may occur in some drilling muds. Accordingly, I prefer to employ a solution containing alkali metal hydroxide to condensation product in a weight ratio of 1:2 or, more preferably, 1:4. By way of illustration, it may be found convenient to employ a 2.5% caustic solution in forming a 5% or, more preferably, a 10% solution of condensation product, but it will be apparent that other concentrations of alkali and condensation product may be employed and satisfactory results obtained.

The invention will be further described by the following examples:

EXAMPLE 1

A molecular weight of salicylic acid was admixed with slightly more than two molecular weights of formaldehyde, in the form of a 40% by volume aqueous solution, and 2% by weight of concentrated hydrochloric acid was added thereto. The resulting mixture was then boiled under reflux until two liquid phases, an upper aqueous phase and a lower oil phase, were formed. The oily phase was recovered from the aqueous phase by decantation. Upon testing, the oily phase appeared to consist predominantly of 2 hydroxy-3,5 dimethylol benzoic acid, admixed with small quantities of 2 hydroxy-3 methylol benzoic acid and 2 hydroxy-5 methylol benzoic acid. A portion of the oily substitution product was neutralized with aqueous sodium hydroxide solution and evaporated to dryness. The resulting neutralized or slightly alkaline salt was found to be ineffective in reducing the viscosity of a synthetic drilling mud.

The dry salt was then heated at 180° to 200° C. for about 4 hours, causing the color thereof to change from white to a dark red as water was evolved. The resulting salt of the condensation product was soluble in water and was found to be an effective agent for treating drilling muds to reduce the viscosity and gel strength thereof.

EXAMPLE 2

A quantity of the oily phase, prepared and separated from aqueous phase as described in Example 1 but without neutralization with alkali, was evaporated to dryness thereby forming a compact, white solid. This solid substitution product, during further heating at about 180° to 200° C., first became rubbery as water was evolved from the mass and then became a porous, easily-powdered, white solid. After continued heating for a total heating time of about 4 hours, the mass condensed to a brittle, dark brown solid resin.

Upon testing a portion of this resin, it was found to be substantially insoluble in water and the common organic solvents, but soluble in 2.5% aqueous sodium hydroxide solution. Since the solid condensation product had no well defined melting point and was insoluble in suitable solvents, its molecular weight could not be readily determined.

The chemical structure of the resinous material is complex and not definitely known but, from measurements of changes in weight at different stages in the reaction as well as measurements of acid values and calculated equivalent weights, it is thought that the condensation product derived from salicylic acid and formaldehyde may be a linear condensation product of several molecules of 2 hydroxy-3,5 dimethylol benzoic acid, resulting in an ether linkage, or it may be a linear condensation product of molecules of the above compound with molecules of either 2 hydroxy 3 methylol benzoic acid or 2 hydroxy 5 methylol benzoic acid, resulting in methylene linkages.

EXAMPLE 3

A quantity of the dark brown, condensation product or resin prepared in the manner described in Example 2 was dissolved in a 2.5% weight aqueous solution of sodium hydroxide to provide a 10% weight solution of the resin in the alkali solution. The resulting resin solution, containing one part by weight of alkali to four parts of resin, was employed in varying amounts to treat several drilling muds identified as follows:

*Mud A.*—A natural mud produced while drilling through natural formation in the Conroe Field, Montgomery County, Texas.

*Mud M.*—Same as mud A but with 4.8% by weight of sodium chloride added thereto.

*Mud C.*—A fresh synthetic mixture containing 39% El Paso clay and 61% fresh water.

*Mud D.*—A natural mud produced while drilling at a depth of about 8000 feet through natural formations in the Mallalieu Field, Lincoln County, Mississippi.

*Mud E.*—A synthetic mixture containing 7.3% by weight of Aquagel (substantially pure Wyoming bentonite) in fresh water.

For purposes of comparison, samples of each of the muds were treated with a 10% weight solution of commercial quebracho in a 10% weight aqueous solution of sodium hydroxide. Sufficient quantities of the above-described 10% resin solution and the 10% quebracho were intimately mixed with separate portions of each of the muds to provide the different treatments, expressed as pounds of resinous treating agent per barrel of mud, shown in Table I.

*Table I*

| Mud | Treating Agent | Lb. of Agent per bbl. of mud | Stormer viscosity, Centipoises | Gel Strength gms. Stormer |
|---|---|---|---|---|
| A | Resin | none | 194 | 160 |
|   |       | 0.1 | 83 | 5 |
|   |       | 0.3 | 55 | 4 |
|   |       | 0.6 | 47 | 0 |
|   |       | 1.2 | 43 | 0 |
|   | Quebracho | none | 194 | 160 |
|   |           | 0.1 | 102 | 5 |
|   |           | 0.3 | 65 | 3 |
|   |           | 0.6 | 58 | 2 |
|   |           | 1.2 | 83 | 4 |
| B | Resin | none | 52 | 70 |
|   |       | 0.3 | 44 | 45 |
|   |       | 0.6 | 39 | 35 |
|   |       | 1.2 | 32 | 22 |
|   | Quebracho | none | 52 | 70 |
|   |           | 0.3 | 70 | 70 |
|   |           | 0.6 | 48 | 55 |
|   |           | 1.2 | 25 | 22 |
| C | Resin | none | 96 | 120 |
|   |       | 0.1 | 91 | 140 |
|   |       | 0.3 | 94 | 160 |
|   |       | 0.6 | 81 | 140 |
|   |       | 1.2 | 50 | 10 |
|   |       | 2.0 | 22 | 0 |
|   | Quebracho | none | 96 | 120 |
|   |           | 0.1 | 110 | 140 |
|   |           | 0.3 | 136 | 150 |
|   |           | 0.6 | 102 | 140 |
|   |           | 1.2 | 34 | 10 |
|   |           | 2.0 | 37 | 0 |
| D | Resin | none | 58 | 70 |
|   |       | 0.1 | 10 | 0 |
|   |       | 0.3 | 10 | 0 |
|   |       | 0.6 | 8 | 0 |
|   |       | 1.2 | 6 | 0 |
|   | Quebracho | none | 58 | 70 |
|   |           | 0.1 | 33 | 0 |
|   |           | 0.3 | 10 | 0 |
|   |           | 0.6 | 10 | 0 |
|   |           | 1.2 | 10 | 0 |
| E | Resin | none | 194 | 160 |
|   |       | 0.1 | 52 | 7 |
|   |       | 0.3 | 47 | 4 |
|   |       | 0.6 | 47 | 0 |
|   |       | 1.2 | 32 | 0 |
|   | Quebracho | none | 58 | 30 |
|   |           | 0.1 | 53 | 7 |
|   |           | 0.3 | 48 | 4 |
|   |           | 0.6 | 43 | 0 |
|   |           | 1.2 | 33 | 0 |

It may be seen from Table I that a 10% solution of the condensation product (resin) of the present invention when dissolved in 2.5% sodium hydroxide solution is more effective in treating various drilling fluids than is a 10% solution of quebracho in sodium hydroxide solution. When employing comparable amounts of active treating agent, the resin of the present invention uniformly produces a greater reduction in viscosity and, in most instances, a greater reduction in gel strength than does the quebracho solution of the prior art. Furthermore, the resin of the present invention does not tend to "overtreat" the mud as does the quebracho.

EXAMPLE 4

For purposes of comparison with other treating agents of the prior art, three materials (designated hereinafter as products X, Y and Z) were prepared in accordance with the teachings of the prior art. Each of the prior art products was added in dry form and in varying amounts to different samples of a drilling fluid composed of 8% by weight of Wyoming bentonite in 92% of fresh water. Comparable amounts of the resin-like condensation product of the present invention (for the purpose of the present example designated as product W) were added in the form of a 10% solution in 2.5% aqueous sodium hydroxide to different samples of the same drilling fluid. Test data on the various treated samples are tabulated in Table II.

Product W was prepared in accordance with the foregoing Example 2.

Product X was prepared by dissolving 100 parts by weight of quebracho extract (70% tannins) in 100 parts of water, and reacting the quebracho solution with 60 parts of sodium bisulfite dissolved in 100 parts of water. The mixture was boiled under reflux for 8 hours to complete sulfitation of the tannin. To the sulfited tannin was added 50 parts of 40% formaldehyde solution and the heating was continued under reflux for an additional 6 hours. The final product was a viscous fluid, colloidally soluble in water and soluble in 2.5% aqueous sodium hydroxide solution.

Product Y was prepared by dissolving 100 parts of chestnut extract (65% tannins) in 200 parts of water, followed by adding a mixture of 100 parts of 40% formaldehyde solution and 25 parts of concentrated hydrochloric acid. The mixture was heated until it became rubbery and gelatinous, after which it was removed from the flame and allowed to remain at room temperature until thoroughly hardened. It was then broken up into small pieces, washed with hot water to remove free acid, and finally was dried at 200° C., followed by pulverization and screening through a 300 mesh screen. The fraction passing through a 300 mesh screen was used in the treatment of a synthetic well drilling fluid.

Product Z was prepared by dissolving 100 parts of quebracho extract (70% tannins) in 200 parts of water, followed by the addition of a mixture of 50 parts of 40% formaldehyde solution and 25 parts of 40% caustic soda solution. The mixture was heated under reflux for one hour. The mass became rubbery and toughened on continued heating. The resulting black resin was air-dried and hardened, broken into small pieces, and washed with water, then dried at 200° C. The dried product was then pulverized and ground to pass through a 300 mesh screen before being used in the treatment of a synthetic drilling fluid.

Table II

| Treating agent | Proportion of active treating agent to drilling fluid | Stormer viscosity, centipoises |
|---|---|---|
| Product W | None | 58 |
|  | 1:2000 | 47.5 |
|  | 1:1000 | 45 |
|  | 1:500 | 26.5 |
|  | 1:333 | 17.5 |
| Product X | None | 58 |
|  | 1:2000 | 58 |
|  | 1:1000 | 56 |
|  | 1:500 | 55 |
|  | 1:333 | 55 |
| Product Y | None | 58 |
|  | 1:2000 | 56 |
|  | 1:1000 | 50 |
|  | 1:500 | 47 |
|  | 1:333 | 42 |
| Product Z | None | 58 |
|  | 1:2000 | 50 |
|  | 1:1000 | 47.5 |
|  | 1:500 | 45 |
|  | 1:333 | 37 |
| Product X dissolved in 2.5% sodium hydroxide | None | 58 |
|  | 1:2000 | 96 |
|  | 1:1000 | [1] 100 |

[1] In excess of 400 grams driving weight.

It may be seen from Table II that the resin-like condensation product of the present invention, when dissolved in 10% concentration in a 2.5% sodium hydroxide solution (product W), was more effective as a treating agent than a comparable amount of product X, Y, or Z.

Products Y and Z were found to be insoluble in water and in dilute caustic solution and accordingly were employed in the dry powdered state in obtaining the data in Table II. Product X, on the other hand, was soluble in 2.5% sodium hydroxide solution but, when tested in 10% concentration in such a solution, caused the viscosity of the drilling fluid to increase markedly.

EXAMPLE 5

A molecular weight of gallic acid was admixed with slightly more than two molecular weights of formaldehyde, in the form of a 40% by volume aqueous solution, and 2% by weight of concentrated hydrochloric acid catalyst was added thereto. The mixture was then boiled under reflux until a powdery solid phase separated from the aqueous phase. The solid was separated from the aqueous phase by decantation and was then evaporated to dryness. The dry solid was then heated strongly at about 180° to 200° C. for approximately 4 hours to form a condensed, resin-like material. A 10% by weight solution of this resin-like material in 2.5% sodium hydroxide solution was found to be effective in reducing the viscosity of a synthetic drilling mud.

EXAMPLE 6

Recent advances in the drilling mud art have indicated that certain lime treated muds may be useful in drilling operations because these muds are less susceptible to contaminants of ionic character than are conventional muds. The lime treated muds also appear to inhibit hydration and sloughing of shales because of the high concentration of calcium ions in the muds. However, these lime muds require special additional treatment to reduce the viscosity and gel strength.

In order to illustrate further the viscosity reducing power of the alkaline, condensation product of the present invention two synthetic "lime" muds were prepared and treated with different quantities of a 2.5% sodium hydroxide solution containing 10% by weight of condensation product prepared as described in Example 2. One of the muds, hereinafter designated mud F, was a 7.3% by weight suspension of Aquagel in fresh water in which had been thoroughly mixed 0.5 pound of slacked lime per barrel of mud. The Stormer viscosity of this mud was raised from 58 centipoises to more than 200 centipoises by the lime treatment.

The other lime treated mud, hereinafter designated mud G, was a natural aqueous mud which was produced while drilling a well in the Conroe field, Montgomery County, Texas, and which was then treated with 0.5 pound of slacked lime per barrel of mud. The Stormer viscosity of the mud was raised from 73 centipoises to 137 centipoises by the lime treatment.

The viscosity reducing effect of different amounts of the alkaline solution of condensation product, expressed as pounds of condensation product per barrel of each of the muds, is shown in Table III.

Table III

| Mud | Lb. of agent per bbl. of mud | Stormer viscosity, Centipoises |
|---|---|---|
| F | None | Over 200 |
|  | 0.25 | 200 |
|  | 0.5 | 99 |
|  | 0.75 | 58 |
|  | 1.0 | 35 |
| G | None | 137 |
|  | 0.1 | 73 |
|  | 0.3 | 48 |
|  | 0.6 | 45 |
|  | 1.2 | 38 |

It may be seen from the data of Table III that the method of the present invention is effective in reducing the viscosity of high lime-content drilling muds to a useful level.

The manner in which the viscosity of the drilling mud is reduced in the practice of the present invention is not exactly known but the following hypothesis is offered by way of explanation. The resinous product obtained by condensing molecules of the substitution product made by reacting aldehyde with an hydroxy aromatic carboxylic acid, when dissolved in alkaline solution, produces highly negative anions. It is believed that the anions are adsorbed on the colloidal particles of the drilling mud to form systems that resist cohesion. It is to be understood that this hypothesis is offered by way of explanation and is not intended by way of limitation.

In the foregoing specification and in the appended claims the terms "condensation product," where used, is intended to denote the resin-like product of a "condensation" reaction wherein the union of two or more molecules within a given homologous series takes place with elimination of one or more molecules of water. As distinguished therefrom, the term "substitution product" has been employed to designate the reaction product of a "substitution" reaction wherein the union of one molecule takes place with at least one other unlike molecule to form a single molecule, generally with rearrangement of atoms within the molecule.

Having fully described and illustrated the practice of the present invention, what I desire to claim as new and useful and to secure by Letters Patent is:

1. An aqueous drilling mud comprising clay and a viscosity reducing amount of an alkaline condensation product derived from substitution of an aldehyde on a non-esterified hydroxy benzene carboxylic acid having at least two substitutable hydrogen atoms in the aromatic nucleus thereof.

2. An aqueous drilling mud comprising clay and a viscosity reducing amount of an alkali metal hydroxide solution of a condensation product derived from substitution of an aldehyde on a non-esterified hydroxy benzene carboxylic acid having a least two substitutable hydrogen atoms in the aromatic nucleus thereof.

3. An aqueous drilling mud comprising clay and a viscosity reducing amount of a sodium hydroxide solution containing a condensation product obtained by substituting formaldehyde on the aromatic nucleus of salicylic acid and condensing the resulting product.

4. An aqueous drilling mud comprising clay and a viscosity reducing amount of a sodium salt of a condensation product obtained by substituting formaldehyde on the aromatic nucleus of salicylic acid, neutralizing the resulting substitution product, and condensing the neutralized product.

GILBERT G. WRIGHTSMAN.

REFERENCES CITED

The following references are of record in the file of this patent:

UNITED STATES PATENTS

| Number | Name | Date |
|---|---|---|
| 2,331,281 | Wayne | Oct. 12, 1943 |